United States Patent

McCartney

[11] 3,995,935
[45] Dec. 7, 1976

[54] OPTICAL COUPLER

[75] Inventor: Ronald L. McCartney, Orange, Calif.

[73] Assignee: International Telephone and Telegraph Corporation, New York, N.Y.

[22] Filed: Apr. 28, 1975

[21] Appl. No.: 572,429

[52] U.S. Cl. ............................ 350/96 C; 350/293
[51] Int. Cl.² ........................................ G02B 5/14
[58] Field of Search .......... 350/96 C, 96 WG, 96 B

[56] References Cited

UNITED STATES PATENTS

| 3,756,688 | 9/1973 | Hudson et al. | 350/96 C |
|---|---|---|---|
| 3,780,295 | 12/1973 | Kapron et al. | 350/96 C |
| 3,874,780 | 4/1975 | Love | 350/96 C |

FOREIGN PATENTS OR APPLICATIONS

| 1,017,354 | 1/1966 | United Kingdom | 350/96 WG |

Primary Examiner—John K. Corbin
Assistant Examiner—Stewart Levy
Attorney, Agent, or Firm—Thomas L. Peterson

[57] ABSTRACT

An optical coupler comprising an optical chamber having a reflective wall. A light emitting device, such as an LED or the end of an optical fiber, is positioned adjacent to one end of the optical chamber. The end of a receiving optical fiber extends into the chamber from the opposite end thereof. A light transmitting filler fills the chamber so that light emitted into the chamber by the light emitting device will reflect off the chamber wall and impinge upon the outer surface of the receiving fiber. The receiving fiber is insensitive to alignment problems due to the close proximity of the reflector and receiver surfaces and the large receiving surface area.

13 Claims, 3 Drawing Figures

OPTICAL COUPLER

BACKGROUND OF THE INVENTION

The present invention relates generally to a connector and, more specifically, to an optical coupler for a single fiber optical cable.

The employment of fiber optic cables or light guides, also sometimes referred to as optical communication fibers, for the transmission of information-bearing light signals, is now an established art. Much development work has been devoted to the provision of practical low-loss glass materials and production techniques for producing glass fiber cables with protective outer claddings or jackets. The claddings make them resemble ordinary metallic-core electrical cable upon superficial external inspection. Obviously, if fiber optic cables are to be used in practical signal transmission and processing systems, practical connectors for the connection and disconnection of fiber optic cables must be provided.

Some references will now be given for background in the state of fiber optic art in general. An article entitled, "Fiber Optics," by Narinder S. Kapany, published in *Scientific American*, Vol. 203, pgs. 72–81, November, 1960, provides a useful background in respect to some theoretical and practical aspects of fiber optic transmission.

Of considerable relevance to the problem of developing practical fiber optic connectors, is the question of transfer efficiency at the connector. Various factors, including separation at the point of abutment, and lateral separation or axial misalignment, are among the factors effecting the light transfer efficiency at a connector. In this connection, attention is directed to the *Bell System Technical Journal*, Vol. 50, No. 10, December 1971, specifically to an article by D. L. Bisbee, entitled, "Measurement of Loss Due to Offset, and End Separations of Optical Fibers". Another *Bell System Technical Journal* article of interest appeared in Vol. 52, No. 8, October, 1973, and was entitled, "Effect of Misalignments on Coupling Efficiency on Single-Mode Optical Fiber Butt Joints," by J. S. Cook, W. L. Mammel and R. J. Grow.

Fiber optic bundles are normally utilized for only short transmission distances in fiber optic communications networks. On the other hand, fibers are used individually as optical data channels to allow transmission over many kilometers. At present, most fiber optic cables are multi-fiber bundles due to the less stringent splicing requirements, greater inherent redundancy and higher signal-to-noise ratio. The difficulty in achieving connections between single fibers which are insensitive to axial misalignment problems has created an obstacle to the use of long run single data transmission systems.

Therefore, a connector or coupler is required to eliminate lateral tolerances if low-loss connections are to be obtained in the use of single fiber optical transmission arrangements. "V" groove and metal sleeve arrangements have been used to interconnect single fibers. Reference is made to U.S. Pat. No. 3,768,146 which discloses a metal sleeve interconnection for single fibers. The problem in achieving alignment between single fibers is enhanced due to the typical lack of concentricity between the fiber core and its outside cladding or jacket. Thus, even if the optical fiber cables are perfectly aligned, the cores therein may be laterally displaced. Therefore, what is needed and constitutes the purpose of the present invention is to provide a coupling arrangement for a single optical fiber and a light emitting device, such as a second fiber or an LED, for example, which may be incorporated into a connector for practical field utilization, which is insensitive to fiber core alignment problems and problems in lack of concentricity between the core and the cladding or jacket of the optical fiber cable.

Reference is made to U.S. Pat. Nos. 3,756,688; 3,780,295; and 3,809,455 which relate to optical fiber couplers which are somewhat relevant to the present invention in that some form of optical means is utilized for directing light from a source to an optical fiber.

SUMMARY OF THE INVENTION

According to the principal aspect of the present invention, there is provided a connector or light coupler arrangement for coupling light from a light emitting device to a single receiving optical fiber. The connector includes an optical chamber having a reflective wall. The light emitting device is positioned adjacent to one end of the chamber for directing light into the chamber. The end of the receiving optical fiber extends into the other end of the chamber. A light transmitting filler fills the chamber so that light emitted into the chamber by the light emitting device will reflect off the chamber wall and impinge upon the outer surface of the receiving fiber. Thus, the receiving fiber within the chamber functions somewhat like an antenna, receiving light at its outer surface reflected off the wall of the chamber. As a consequence, the receiving fiber is insensitive to alignment problems due to the close proximity of the reflector and receiver surfaces and the large receiving surface area. This arrangement results in optical losses for single fiber optic interconnections on the order of only about 0.5 db.

DESCRIPTION OF THE PREFERRED EMBODIMENTS

The present invention is generally applicable to the interconnection of a single optical fiber cable with a like cable or other light emitting device which will be described later. A conventional single optical fiber cable comprises an optical fiber and an outer protective jacket typically formed of plastic. The fiber consists of an inner core and an outer layer called a cladding. A variety of such optical fibers are now available. The fibers may have a plastic core, with a plastic cladding, a glass core with a plastic cladding, or a glass core with glass cladding. More recently, a chemical vapor deposition (CVD) fiber has become available consisting of a quartz fiber having an inner germanium core. The first embodiment of the invention is applicable to those cables having fibers with cladding which may be readily removed, such as plastic cladding.

Figure 1:
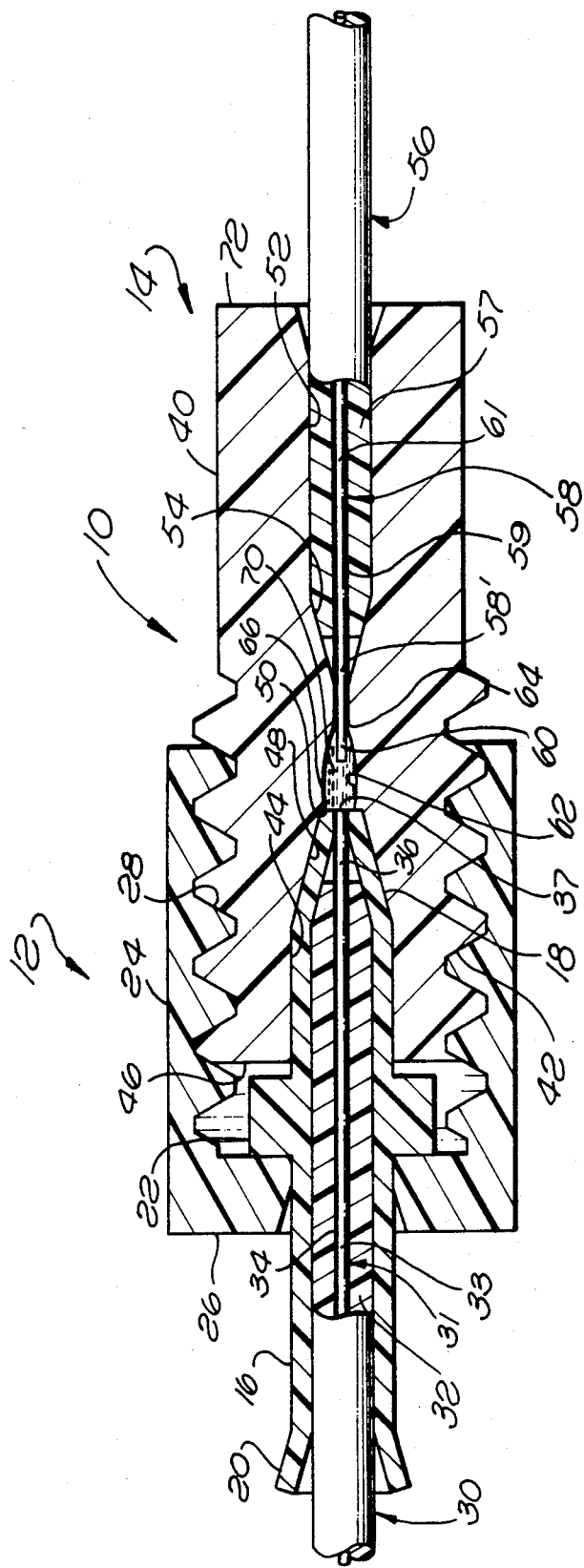
FIG. 1 is a longitudinal sectional view through one embodiment of the connector of the present invention employing my novel optical antenna coupler arrangement.
Figure 2:
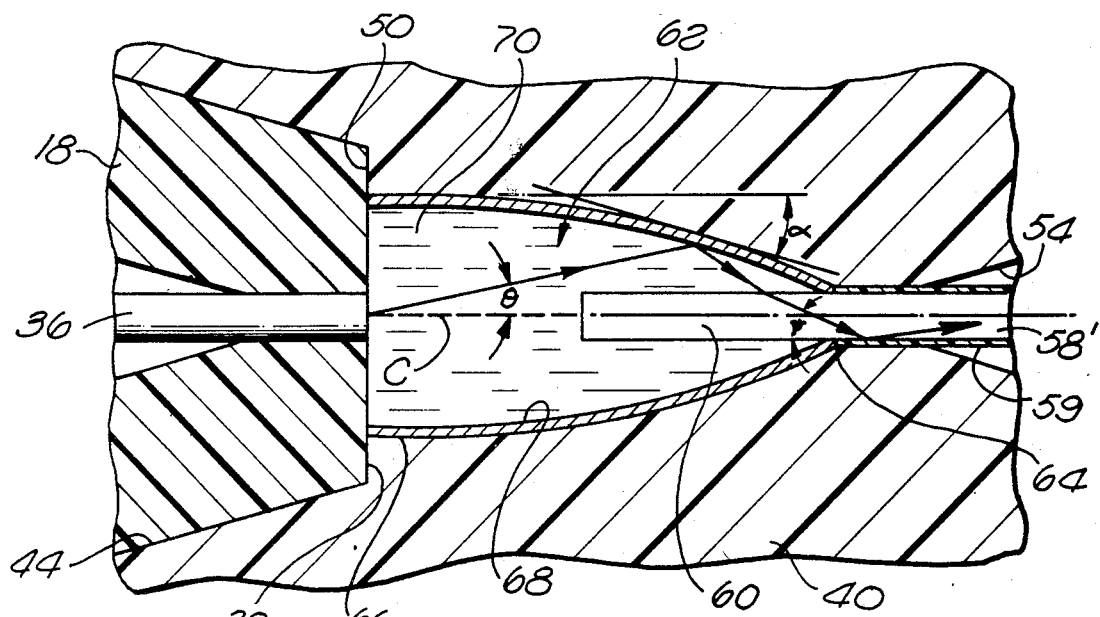
FIG. 2 is an enlarged fragmentary sectional view showing the details of construction of the optical antenna coupler illustrated in FIG. 1.

Referring now to FIGS. 1 and 2 of the drawing, which illustrate the first embodiment of the connector of the present invention, generally designated 10, consisting of a plug connector member 12 and a receptacle connector member 14. Such connector members are sometimes referred to in the art as being a male contact and female contact. The plug connector member 12 comprises an elongated generally cylindrical body 16 which is tapered downwardly at its forward end 18 and flared outwardly at its rear end 20. The body 16 may be formed of a suitable insulation material, such as plastic although it could also be formed of metal if desired. An outwardly extending annular flange 22 is formed on the body 16 between its forward and rear ends. A coupling nut 24 is rotatably mounted on the body 16. The nut includes an inwardly extending flange 26 which is positioned behind the flange 22 on body 16. The inner wall of the coupling nut 24 is threaded as indicated at 28. A single optical fiber cable, generally designated 30, is mounted within the cylindrical body 16. The cable comprises an optical fiber 31 and an outer plastic jacket 32. The fiber 31 consists of an inner core 33, which may be formed of plastic or glass, and an outer plastic cladding 34. By way of example only, the core 33 may be solid quartz and the cladding 34 FEP plastic. The end of the plastic jacket 32 is cut and removed leaving a bare end portion 36 of the fiber which extends into the tapered forward end 18 of body 16. The tip 37 of the fiber end portion 36 is flush with the flat forward end surface 38 of the body.

The receptacle connector member 14 comprises a generally cylindrical connector body 40 which may be formed of insulation material or metal. The forward end 32 of the body 40 is externally threaded so as to threadedly engage with the coupling nut 24 on the plug connector member 12. A generally cylindrical cavity 44 is provided in the forward portion of the connector body 40 coaxial with the longitudinal axis of the body. The cavity 44 opens at the forward end 46 of body 40. The rear portion 48 of the cavity 44 tapers downwardly in the rearward direction to the flat bottom 50 of the cavity. The configuration of the cavity 44 is complementary to the configuration of the forward end of connector body 16 so that the latter may be slid into the cavity until the flat forward end surface 38 thereof abuts against the flat bottom 50 of the cavity.

A cylindrical passage 52 is formed in the rear portion of the connector body 40 coaxial with the axis of the cavity 44. The forward end 54 of the passage 52 tapers downwardly in the forward direction. A second single optical fiber cable, generally designated 56, is mounted in the passage 52. The cable 56 may be identical to the cable 30 in the plug connector member 12. The end of the jacket 57 on the fiber 58 of the cable 56 is removed to leave a bare forward portion 58' of the fiber. The cladding 59 on the fiber is removed at the tip of the bare end 58' providing an unclad forward end 60 of fiber core 61.

A tapered optical chamber 62 is provided in the connector body 40 between the passage 52 and cavity 44.

The smaller end 64 of the tapered optical chamber connects to the tapered forward end 54 of passage 52. The larger end 66 of the chamber opens at the flat bottom 50 of cavity 44. The wall of the chamber 62 is symmetrical with respect to its center axis, which is coaxial with the axes of the cavity 44 and passage 52. The unclad forward end 60 of the fiber 58 extends through the smaller end 64 of the chamber 62, and terminates at a point between the ends of the chamber, and thus spaced from the optical fiber 31 in the plug connector member. The wall of the chamber is coated with a metallic layer 68, such as gold, to provide a reflective surface on the wall. The chamber is filled with a filler, designated 70, which may be a liquid, gel or a substance which hardens into a semisolid or solid mass. The index of refraction of the filler must be greater than that of the core 61 of the optical fiber 58.

The receptacle connector member 14 is assembled by first inserting the cable 56 into the passage 52 from the rear end 72 of the connector body 40, thereby positioning the cylindrical unclad forward end 60 of the fiber core 61 within the optical chamber 62. The chamber is then filled with a suitable filler, such as by the use of a syringe inserted through the cavity 44. Thereafter the connector members 12 and 14 are mated so that the forward end of the connector body 16 extends partially into the cavity 44. The coupling nut 24 is then rotated to threadedly engage the nut on the forward threaded end 42 of the body 40, thereby pulling the two connector members together until the forward end surface 38 of the body 16 bottoms out against the flat bottom 50 of the cavity 44. When the connector members are so mated, the forward ends 36 and 60 of the optical fibers 31 and 58, respectively, will be in general alignment with each other, but not necessarily in exact alignment.

In use, light is transmitted through the optical fiber 31 into the chamber 62. The unclad end 60 of the core of the fiber 58 within the chamber acts somewhat like an antenna, which gathers light that is reflected from the reflective surface 68 on the chamber wall. Since the chamber size is about two to three times larger in diameter than the unclad core end 60, the antenna diameter is large in comparison to a line source. The connector is therefore insensitive to fiber alignment problems. Also, the connector is insensitive to lack of fiber core concentricity with respect to the outer surface of the fiber cladding.

It is noted that the optical chamber 62 is defined by a rotated conical section. As seen in FIG. 2, the conical section is rotated about a center line C which is coaxial with the longitudinal axes of the cavity 44 and passage 52 in connector body 40. The slope of the optical chamber can be selected to accommodate for different refractive indexed fillers 70. Thus, any filler material having the physical and chemical properties required for a particular application may be utilized by simply selecting the appropriate slope of the wall of the chamber 62. The slope $\alpha$ of the chamber wall relative to the center axis C is defined by the equation $$\alpha = \tfrac{1}{2} \left[ \cos^{-1} \left[ \frac{N_1}{N_2} (\cos \psi) \right] - \theta_2 \right] \quad (1)$$

$N_1$ is the index of refraction of the fiber core 61. $N_2$ is the index of refraction of the filler 70. $\psi$ is the propagation angle of light in the fiber 58. The symbol $\theta$ is the angle of emission of light from the fiber core 31. The requirements of the following equation must also be met $$\psi < \sin^{-1}\left(\frac{NA}{N_1}\right) \quad (2)$$

NA is the numerical aperture of the fiber 58. As stated previously, $N_2$ must be greater than $N_1$. To determine the shape or curve of the chamber wall, equation 1 above must be integrated.

The first embodiment of the invention described hereinabove utilizes a receiving optical fiber 58 having a cladding 59 which may be removed from the core, so that the bare end of the core may be inserted into the optical chamber. The light emitting from the fiber 31 reflecting off the wall of the chamber impinges upon the cylindrical outer surface of the bare fiber core 60. It is not practical to remove glass cladding from a glass core optical fiber or the cladding from a CVD fiber. The latter fibers are sometimes desired for use in optical transmission systems since they can be made in very small sizes. For example, there is commercially available a CVD fiber having an outer diameter of 5 mils and the diameter of the inner core ranges from about 0.1 mils to 2 mils. The second embodiment of the present invention, illustrated in FIG. 3, applies to a connector utilizing a clad optical fiber in which the cladding cannot be conveniently removed. The embodiment illustrated in FIG. 3 is somewhat similar to that illustrated in FIGS. 1 and 2, and like reference characters primed will be utilized to denote like or corresponding parts.

Figure 3:
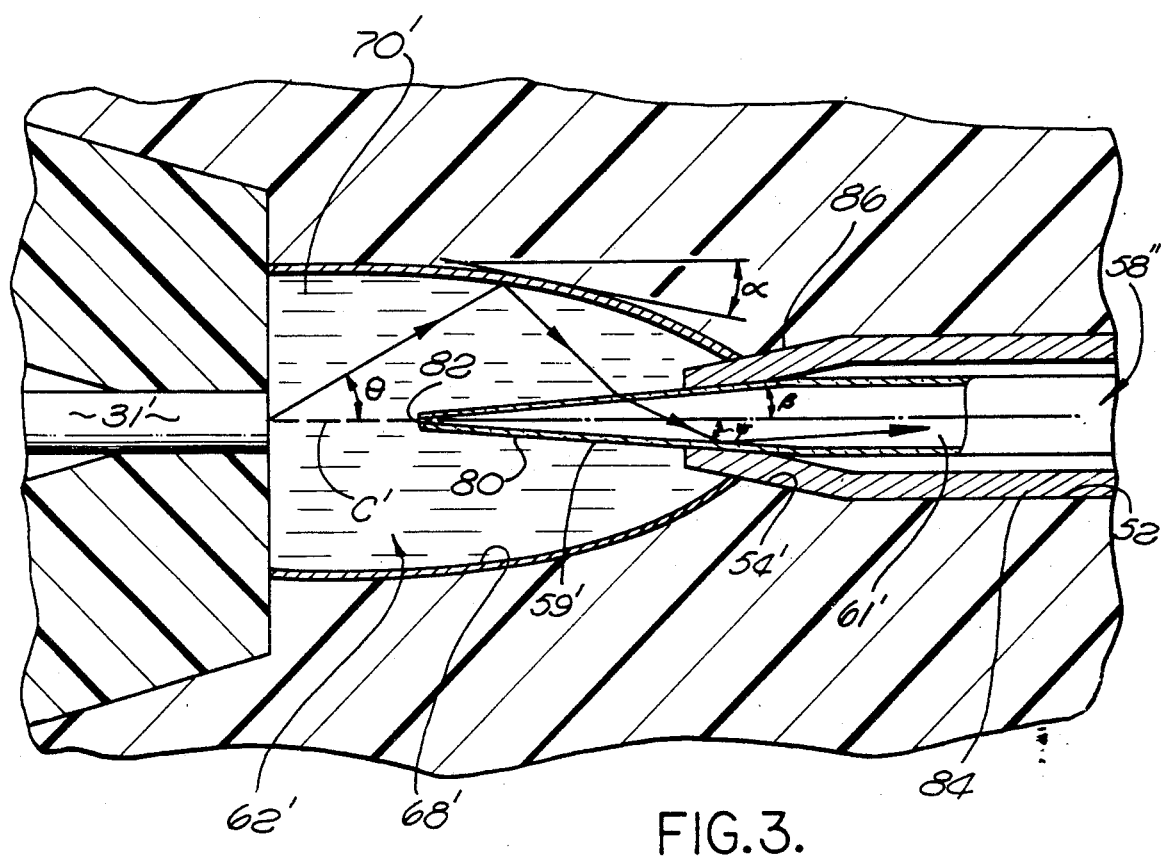
FIG. 3 is a fragmentary sectional view of an alternative form of the optical antenna coupler of the invention.

The glass clad optical fiber 58'' in FIG. 3 is heated and drawn down to a point thereby providing a forward end 80 of conical configuration. The tip of the pointed end 80 may be removed, as shown, to provide a small flat end surface 82. While a slight amount of light emanating from the fiber 31' will enter the end surface 82, it is not intended that any significant amount of light will pass through the fiber 58'' via the end surface. Since the fiber 58'' is drawn down to a point, the cladding 59' thereof will remain on the conical forward end 80 of the fiber. The fiber 58'' is mounted within a metal ferrule 84 which has a tapered forward end 86 corresponding to the taper of the conical forward end 80 of the fiber so that the fiber will be positioned firmly within the ferrule. The tapered forward end 54' of the passage 52' is complementary to the taper of the forward end of the ferrule 84 to permit accurate and firm positioning of the ferrule and thus the fiber in the connector body 40'.

In this embodiment, the filler 70', which may be a liquid, solid or gel, may have an index of refraction which is more, less or equal to the index of refraction of either the core 61' or the cladding 59' of the optical fiber 58'''. Preferably, the index of refraction of the filler is about 1.5. In addition, it is desirable that the optical chamber 62' have the configuration of a truncated parabola rotated about the center line C' of the chamber axis.

The slope of the wall of the optical chamber 62' is defined by the following equation:

$$\alpha = \tfrac{1}{2}\left[\cos^{-1}\left[\frac{N_1}{N_2}(\cos(\psi+\beta))\right] - (\theta_2+\beta)\right] \quad (3)$$

It is noted that equation 3 is identical to equation 1 except for the factor $\beta$, which is the angle of the conical forward end 80 of the fiber core 61', that is, the angle of the tapered surface of the conical end of the core with respect to the axis of the core.

The following equations must also be met:

$$\psi + \beta > \sin^{-1}\left(\frac{NA}{N_1}\right) \quad (4)$$

$$\psi < \sin^{-1}\left(\frac{NA}{N_1}\right) \quad (5)$$

NA is the numerical aperture of the optical fiber 58''. It is well known in the art that NA is determined by the following equation:

$$NA = [N_1^2 - N_3^2]^{1/2} \quad (6)$$

$N_3$ is the refractive index of the cladding 59'.

In order to determine the curve or shape of the optical chamber 62', equation 3, above, must be integrated.

The second embodiment of the invention illustrated in FIG. 3 is similar to that illustrated in FIG. 2 in that light emanating from the optical fiber 31' reflects off the reflective coating 68' on the optical chamber wall 62' and impinges upon the forward end of the optical fiber core within the chamber. However, in this embodiment the light reflecting off the chamber wall passes through the cladding 59' and enters the conical forward end 80 of the optical fiber 58''', and thereafter passes longitudinally through the fiber core. As in the first embodiment, the light coupler arrangement illustrated in FIG. 3 is insensitive to lateral displacements or misalignment of the optical fibers in the connector.

While the light transmitting device employed in the connector 10 described herein has been specifically referred to as being an optical fiber (the fiber 31) other light emitting devices may be substituted therefor. For example, the fiber 31 could be replaced by a laser rod or a light emitting diode, so long as such devices are positioned adjacent to the larger end of the tapered optical chamber 62. Also, the optical chamber may have other configurations than those specifically disclosed herein depending upon the propagation angle of light desired in the receiving optical fiber. For example, in the first embodiment of the invention the chamber 62 could be cylindrical and in the second embodiment the chamber 62' could have an enlarged center area tapering down to the opposite ends which receive the optical fibers.

What is claimed is:

1. A connector for coupling light from a light emitting device to a single optical fiber comprising:
   an optical chamber having a reflective wall, and first and second ends;
   said light emitting device being positioned adjacent to said first end of said chamber for directing light into said chamber;
   said single optical fiber having an end extending into said chamber from said second end thereof, said fiber extending into said chamber a distance substantially greater than the diameter of the fiber; and a light transmitting filler filling said chamber whereby light emitted into said chamber by said light emitting device will reflect off said chamber wall and impinge upon said fiber, said reflective wall having a configuration such that a substantial majority of said light emitted into said chamber will impinge upon the outer curved surface of said fiber and will enter said surface at an angle so as to propogate continuously through said fiber.

2. A connector as set forth in claim 1 wherein:
said optical chamber has a center axis; and
said light emitting device and fiber are generally, but not necessarily exactly, coaxial with said center axis.

3. A connector as set forth in claim 1 wherein:
said light emitting device is an optical fiber.

4. A connector as set forth in claim 1 wherein:
said chamber wall is coated with a metallic layer.

5. A connector as set forth in claim 1 wherein:
said end of said fiber is tapered.

6. A connector for coupling light from a light emitting device to a single optical fiber having a core covered with light translucent cladding comprising:
an optical chamber having a reflective wall, and first and second ends;
said light emitting device being positioned adjacent to said first end of said chamber for directing light into said chamber;
said single optical fiber having a tapered end extending into said chamber from said second end thereof, said fiber tapered end extending into said chamber a sufficient distance so that the outer curved surface of said fiber exposed within said chamber substantially exceeds the area of the end face of said fiber, the core of said fiber tapered end being covered with said light translucent cladding; and
a light transmitting filler filling said chamber whereby light emitted into said chamber by said light emitting device will reflect off said chamber wall and impinge upon said outer curved surface of said fiber.

7. A connector as set forth in claim 6 wherein:
said chamber is defined by a rotated truncated parabola.

8. A connector as set forth in claim 6 wherein:
said chamber has a center axis;
the slope ($\alpha$) of said chamber wall relative to said center axis is defined by the equations $$\alpha = \frac{1}{2} \left[ \cos^{-1} \left[ \frac{N_1}{N_2} (\cos(\psi + \beta)) \right] - (\theta_2 + \beta) \right]$$

where $N_1$ is the index of refraction of the fiber core, $N_2$ is the index of refraction of said filler, $\psi$ is the propogation angle of light in said fiber, $\beta$ is the angle of the tapered end of fiber and $\theta$ is the angle of emission of light from said light emitting device;

$$\psi + \beta > \sin^{-1}\left(\frac{NA}{N_1}\right)$$

and $$\psi < \sin^{-1}\left(\frac{NA}{N_1}\right)$$

where NA is the numerical aperture of said fiber.

9. A connector for coupling light from a light emitting device to a single optical fiber having a core covered with cladding comprising:
an optical chamber having a reflective wall, and first and second ends;
said light emitting device being positioned adjacent to said first end of said chamber for directing light into said chamber;
said single optical fiber having an unclad, cylindrical core end extending into said chamber from said second end thereof, said fiber core end extending into said chamber a sufficient distance so that the cylindrical surface of said fiber core end exposed within said chamber substantially exceeds the area of the end face of said fiber core end; and
a light transmitting filler filling said chamber whereby light emitted into said chamber by said light emitting device will reflect off said chamber wall and impinge upon said cylindrical surface of said fiber core end.

10. A connector as set forth in claim 9 wherein:
said filler has an index of refraction greater than that of said fiber.

11. A connector as set forth in claim 9 wherein:
said chamber is defined by a rotated conical section.

12. A connector as set forth in claim 9 wherein:
said chamber has a center axis;
the slope ($\alpha$) of said chamber wall relative to said center axis is defined by the equations $$\alpha = \frac{1}{2} \left[ \cos^{-1} \left[ \frac{N_1}{N_2} (\cos \psi) \right] - \theta_2 \right]$$

where $N_1$ is the index of refraction of the fiber core, $N_2$ is the index of refraction of said filler, $\psi$ is the propogation angle of light in said fiber and $\theta$ is the angle of emission of light from said light emitting device; and $$\psi < \sin^{-1}\left(\frac{NA}{N_1}\right)$$

where NA is the numerical aperture of said fiber.

13. A connector as set forth in claim 12 wherein:
$N_2$ is greater than $N_1$.